US012504319B2

(12) United States Patent
Lefebvre-Albaret et al.

(10) Patent No.: US 12,504,319 B2
(45) Date of Patent: Dec. 23, 2025

(54) SYSTEM FOR MONITORING MOVEMENTS OF AN OBJECT WHILE LIMITING THE USE OF RESOURCES

(71) Applicant: Airbus Operations (S.A.S.), Toulouse (FR)

(72) Inventors: François Lefebvre-Albaret, Toulouse (FR); Yacine Habbeddine, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 163 days.

(21) Appl. No.: 18/420,042

(22) Filed: Jan. 23, 2024

(65) Prior Publication Data

US 2024/0247973 A1   Jul. 25, 2024

(30) Foreign Application Priority Data

Jan. 24, 2023 (FR) ........................................ 2300645

(51) Int. Cl.
*G01H 9/00* (2006.01)
*G01D 5/28* (2006.01)

(52) U.S. Cl.
CPC ................. *G01H 9/00* (2013.01); *G01D 5/28* (2013.01)

(58) Field of Classification Search
CPC ............ G01H 9/00; G01D 5/28; H04N 23/95; H04N 23/71; G06T 7/246; G06T 2207/10016
See application file for complete search history.

(56) References Cited

U.S. PATENT DOCUMENTS

| | | | | |
|---|---|---|---|---|
| 5,838,370 A * | 11/1998 | Kaji | ..................... | H04N 23/673 348/347 |
| 6,084,672 A * | 7/2000 | Lewin | .................. | G01B 9/0203 359/370 |
| 10,865,376 B2 * | 12/2020 | Drazek | .................. | C12M 41/46 |
| 2001/0003466 A1 * | 6/2001 | Kubo | ..................... | H04N 23/72 348/371 |
| 2003/0067423 A1 * | 4/2003 | Suyama | .................. | H04N 13/32 348/E13.052 |
| 2012/0307028 A1 * | 12/2012 | Kanamori | .......... | A61B 1/00009 348/E7.085 |
| 2012/0307136 A1 * | 12/2012 | Katsuda | ................. | H04N 23/71 348/E5.04 |
| 2014/0232849 A1 * | 8/2014 | Ogawa | .................. | G06T 7/0004 348/87 |
| 2016/0364015 A1 * | 12/2016 | Send | ...................... | G02B 27/10 |
| 2017/0137772 A1 | 5/2017 | Drazek | | |
| 2018/0373161 A1 * | 12/2018 | Coskun | ................. | G06T 7/0004 |

(Continued)

OTHER PUBLICATIONS

French Search Report for Application No. 2300645 dated Jul. 11, 2023.

*Primary Examiner* — Mohamed K Amara
(74) *Attorney, Agent, or Firm* — KDW Firm PLLC

(57) ABSTRACT

A system includes at least a plane semi-reflecting mirror, a light source which is configured to emit a continuous illumination and an event camera to generate events when the object exhibits at least one movement. The plane semi-reflecting mirror is arranged so that it reflects at least the illumination toward the event camera in order to dazzle the camera. The system makes it possible to limit the memory and energy consumption required for monitoring.

13 Claims, 3 Drawing Sheets

(56) References Cited

U.S. PATENT DOCUMENTS

| | | | |
|---|---|---|---|
| 2020/0228694 A1* | 7/2020 | Ishida | H04N 23/63 |
| 2021/0058591 A1* | 2/2021 | Takashima | H04N 25/17 |
| 2022/0316867 A1* | 10/2022 | Suzuki | G06T 7/521 |
| 2023/0041754 A1* | 2/2023 | Yoshida | G01H 17/00 |
| 2023/0252616 A1* | 8/2023 | Ikeda | G02B 27/30 |
| | | | 382/141 |

* cited by examiner

SYSTEM FOR MONITORING MOVEMENTS OF AN OBJECT WHILE LIMITING THE USE OF RESOURCES

TECHNICAL FIELD

The disclosure herein relates to a system for monitoring movements of an object which is liable to move.

BACKGROUND

Water hammer is a pressure surge phenomenon which may appear when the speed of a liquid in a pipe varies suddenly, as a result of a valve or a tap being closed or opened rapidly or a pump being started or stopped. This phenomenon may be encountered on board an aircraft. Generally, the water hammer may cause damage to the fastening elements which hold the pipes on board the aircraft. It may therefore be advantageous to monitor the pipes which are subject to water hammer in order to know the full story of the appearance of the water hammer phenomenon. Monitoring may be carried out using cameras. However, using normal cameras may turn out to consume a lot of image storage space and energy.

One objective of the disclosure herein is to propose a solution which makes it possible to use cameras to monitor rapid and/or sudden variation phenomena, such as water hammer, while limiting the consumption of resources such as memory resources and energy resources. The proposed solution may be used in the monitoring of various types of phenomena causing sudden and/or rapid movements of an object.

SUMMARY

The disclosure herein relates to a system for monitoring movements of an object which is liable to move.

According to the disclosure herein, the system comprises:
a plane semi-reflecting mirror;
a first light source configured to emit a continuous first illumination;
an event camera exhibiting a sensor intended to capture variations in luminosity in a scene in which the object is liable to move, the sensor being liable to generate at least one event when the sensor captures at least one variation in luminosity caused by at least one movement of the object;
the plane semi-reflecting mirror being arranged so that the plane semi-reflecting mirror reflects, at least in part, the first illumination as a first illumination reflected toward the sensor of the event camera.

Thus, using an event camera which records events only when an event occurs makes it possible to limit the memory and energy resources. Moreover, illuminating the camera by the first illumination makes it possible to limit the number of events which may be generated in the low-luminosity areas.

Advantageously, the system further comprises a second light source configured to emit a second illumination, the second light source being placed in an image of the focus of the event camera symmetrically with respect to the plane semi-reflecting mirror;
the semi-reflecting mirror being, furthermore, arranged so that the semi-reflecting mirror reflects, at least in part, the second illumination toward the scene in which the object is liable to move.

According to a first variant, the first light source is configured to illuminate the sensor of the event camera uniformly.

According to a second variant, the first light source is configured to illuminate the sensor of the event camera non-uniformly, the first light source being configured to emit a first illumination and a reflected first illumination exhibiting a light pattern having a constant luminosity except in regions of interest in which the luminosity is lower than the constant luminosity.

Furthermore, the system comprises at least one target intended to be fastened to the object which is liable to move, the one or more targets exhibiting a specific pattern which exhibits a non-zero luminance contrast between at least two areas of the specific pattern.

According to a second example, the one or more targets comprise retro-reflecting areas.

Moreover, the system comprises a storage device configured to store the events which are generated by the sensor of the event camera.

Furthermore, the system comprises a detection device configured to detect at least one movement in the scene, the detection device being able to transmit, to a control unit of the event camera, a wake-up signal which is liable to switch on the event camera when the detection device detects at least one movement in the scene.

According to a first embodiment, the second illumination emitted by the second light source corresponds to a continuous illumination.

According to a second embodiment, the second illumination emitted by the second light source corresponds to an illumination exhibiting an intensity which varies sinusoidally as a function of time.

According to a third embodiment, the second illumination emitted by the second light source corresponds to an illumination exhibiting an intensity which varies intermittently as a function of time.

Moreover, the system comprises a processing device configured to determine, as a function of time, the position of the object and/or the speed at which the object moves on the basis of the events which are generated by the sensor of the event camera.

In addition, the processing device is configured to determine one or more movement vibration frequencies on the basis of the positions of the object.

BRIEF DESCRIPTION OF THE DRAWINGS

The appended figures will make it easy to understand how the disclosure herein may be implemented. In these figures, identical reference signs designate similar elements.

DETAILED DESCRIPTION

Figure 1:
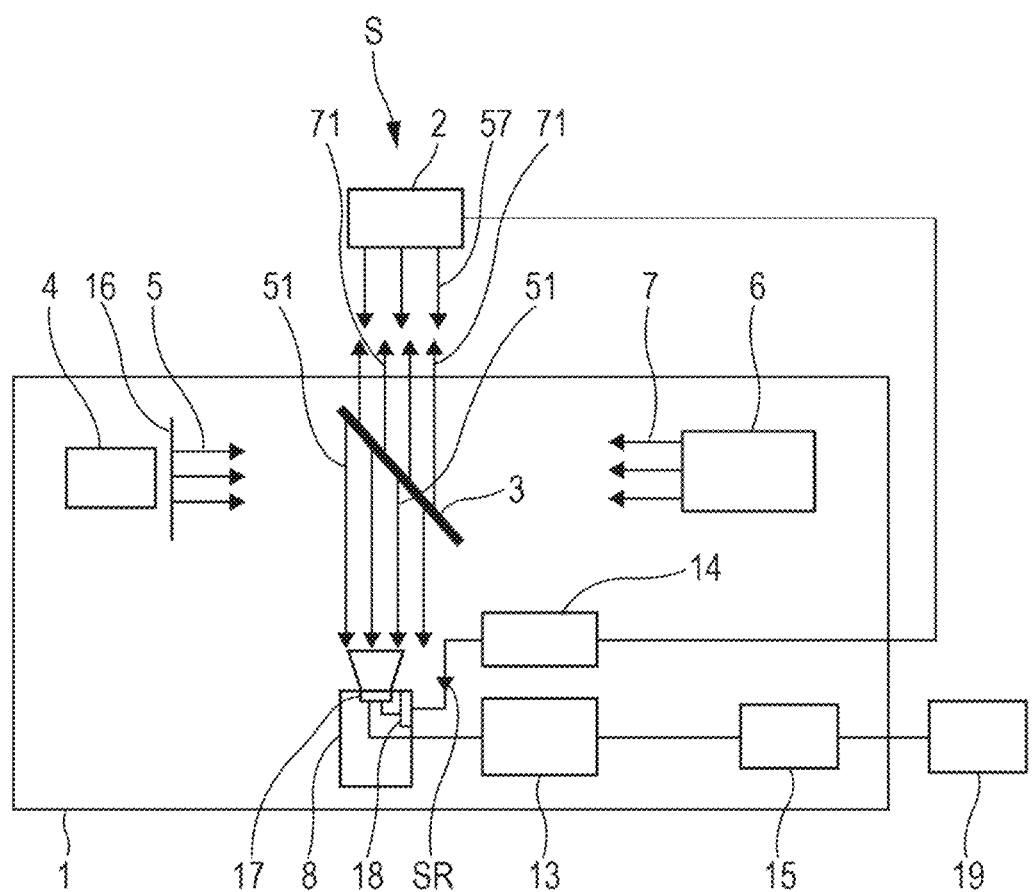
FIG. 1 is a schematic depiction of the monitoring system.

The system (system 1 below) for monitoring movements of an object 2 is depicted schematically in FIG. 1.

In the case of the water hammer phenomenon, the object 2 may correspond to a pipe.

The system 1 comprises at least a plane semi-reflecting mirror 3, a first light source 4 and a camera based on recording events which will be called an event camera 8.

The first light source 4 is configured to emit a continuous first illumination 5. The plane semi-reflecting mirror 3 reflects, at least in part, the first illumination 5 as a first illumination 51 reflected toward the event camera 8.

The event camera 8 exhibits a sensor 17 intended to capture at least one variation in luminosity in a scene S in which the object 2 is liable to move. The sensor 17 may correspond to an array of pixels.

The plane semi-reflecting mirror 3 reflects, at least in part, the first illumination 5 as a first illumination 51 reflected toward the sensor 17 of the event camera 8. The sensor 17 of the event camera 8 is liable to generate at least one event when the sensor 17 captures at least one variation in luminosity caused by at least one movement of the object. The sensor 17 may thus generate at least one event when a pixel of the sensor 17 captures a variation in luminosity in the scene S.

An event camera (or event-based camera) comprises a sensor 17 exhibiting an array of pixels which react independently to the variations in luminosity when they occur. Each pixel of the sensor 17 stores a reference luminosity level and continuously compares it to the captured current luminosity level. If the luminosity difference exceeds a threshold or if the ratio between the current luminosity level and the reference luminosity level exceeds a threshold, this pixel resets its reference level to the current luminosity level (this makes it possible for the sensor 17 to adapt to the ambient luminosity) and then generates an event: a discrete packet containing the address and the timestamp of the pixel. The event generated by the sensor therefore corresponds to a signal which is representative of a discrete packet containing the address and the timestamp of the pixel. Each of the events may also contain the polarity (increase or decrease) of a variation in luminosity or an instantaneous measurement of the illumination level. Thus, the sensor 17 of the event camera 8 generates an event. Here, an event may be caused by a movement of the object 2.

An event camera 8 has the advantage of consuming very little energy and very little memory in order to store images (with respect to a normal camera which captures images continuously). Moreover, an event camera 8 is inexpensive. It generates a limited data stream (for example, 50 MB/s) and may theoretically generate events with a temporal resolution of around 1 ms. It may be powered by a power of 10 mW. It may therefore be used for in-flight tests for which small movements and vibrations may be captured during long in-flight tests which may last more than three hours.

According to a first variant embodiment, the first light source 4 is configured to illuminate the sensor 17 of the event camera 8 uniformly. The first illumination 5 emitted by the first light source 4 is therefore uniform. The first illumination 51 reflected by the plane semi-reflecting mirror 3 is also uniform. A light source illuminates uniformly if it illuminates at least the whole scene S, the variations in luminosity in which are captured by the sensor 17 of the event camera 8, uniformly (that is to say with the same luminosity). In order to obtain uniformity of the first light radiation 5, the system 1 may comprise a screen 16 equipped with a diffuser which uniformly diffuses the illumination coming from the first light source 4.

According to a second variant embodiment, at least the first light source 4 is configured to illuminate the sensor 17 of the event camera 8 non-uniformly. A light source illuminates non-uniformly if it illuminates at least the whole scene S, the variations in luminosity in which are captured by the sensor 17 of the event camera 8, non-uniformly. In this second variant embodiment, the first light source 4 is configured to emit a first illumination 5 and a reflected first illumination 51 exhibiting a light pattern. For example, the light pattern may exhibit a constant luminosity except in certain regions of interest in which the luminosity is lower than the constant luminosity. Thus, only the events in the regions of interest will be captured by the sensor 17 of the event camera 8. The non-uniformity of the reflected first illumination 51 may be obtained by virtue of a non-uniform first light source 4. It may also be obtained using a plane semi-reflecting mirror 3 the surface of which has been configured to obtain, on the basis of a first illumination 5, a reflected first illumination 51 exhibiting the desired light pattern.

The plane semi-reflecting mirror 3 is arranged so that it reflects, at least in part, the first illumination 5 toward the sensor 17 of the event camera 8. The sensor 17 of the event camera 8 is therefore "dazzled" by the reflected first illumination 51, that is to say the reflected first illumination 51 is directed toward the sensor 17 of the event camera 8.

The luminance of the light radiation received by a pixel, of coordinates (x, y), of the sensor 17 of the event camera 8 at an instant t is determined by the following relationship:

$$P(x, y, t) = S(x, y, t) \times L(t) + K,$$

in which:
P(x, y, t) corresponds to the luminance received by a pixel, of coordinates (x, y), of the sensor 17 of the event camera 8 at an instant t,
S(x, y, t) corresponds to the brightness of a point in the scene S received by a pixel, of coordinates (x, y), of the sensor 17 of the event camera 8 at an instant t,
L(t) corresponds to the luminous intensity illuminating the scene S (for example, the luminous intensity of the ambient light), and
K corresponds to the luminance of the first illumination 51 reflected by the plane semi-reflecting mirror 3.

If K=0 (in other words: if the sensor 17 of the event camera 8 is not "dazzled" by the reflected first illumination 51), the variation in the luminous intensity (or in luminosity) L(t) causes the appearance of events in several places which correspond to all the boundaries between two contrasting colors or to textured portions of the scene S. This causes a large number of events.

However, if the sensor 17 of the event camera 8 is "dazzled" by the first illumination 5 emitted by the first light source 4 (in particular, if K and max(S(x, y, t)×L(t)) are of the same order of magnitude), only the brightest portions of the scene S cause events.

According to a preferred embodiment, the system 1 comprises a second light source 6 configured to emit a second illumination 7. The plane semi-reflecting mirror 3 is, furthermore, arranged so that it reflects, at least in part, the second illumination 7 toward the scene S in which the object 2 is liable to move. Moreover, the second light source 6 is arranged in the image of the focus of the event camera 8. L(t) then corresponds to the luminous intensity of the second illumination 71 reflected by the plane semi-reflecting mirror 3 illuminating the scene S.

According to a first variant of this preferred embodiment, the second illumination 7 emitted by the second light source 6 corresponds to an illumination which is continuous over time. This means that the luminous intensity of the second illumination 7 remains constant over time.

According to a second variant, the second illumination 7 emitted by the second light source 6 corresponds to sinusoidal light radiation. This means that the luminous intensity of the second illumination 7 varies sinusoidally or in triangular fashion as a function of time.

According to a third variant, the second illumination 7 emitted by the second light source 6 corresponds to intermittent light radiation, such as stroboscopic light radiation. This means that the luminous intensity of the second illumination 7 varies intermittently as a function of time.

When the second light radiation 7 varies sinusoidally or intermittently, the events are generated in regular time frames in order to estimate the positions of targets 10 at a constant frame rate.

However, a continuous illumination makes it possible to avoid the events being generated all at the same time, which makes it possible to obtain better temporal precision.

By way of example, as depicted in FIG. 1, the sensor 17 of the event camera 8 faces the scene S in which the object 2 is liable to move. The first light source 4 is arranged so that the first illumination 5 is oriented toward the second light source 6 and the second light source 6 is arranged so that the second illumination 7 is oriented toward the first light source 4. The first illumination 5 and the second illumination 7 propagate in the same direction before each being reflected by the plane semi-reflecting mirror 3. The plane semi-reflecting mirror 3 is arranged in order for it to be contained in a plane at 45° to the direction in which the first illumination 6 and the second illumination 7 propagate, so that a first face of the plane semi-reflecting mirror 3 reflects, at least in part, the first illumination 5 at 90° toward the sensor 17 of the event camera 8 (reflected first illumination 51) and that a second face of the plane semi-reflecting mirror 3 reflects, at least in part, the second illumination 7 at 90° toward the scene S in which the object 2 is liable to move (reflected second illumination 71). In this example, the system 1 also comprises a screen 16 which makes it possible to diffuse the first illumination 5, emitted by the first light source 4, uniformly.

The variations in luminosity in the scene S are captured by the sensor 17 of the event camera 8 through the plane semi-reflecting mirror 3.

The system 1 may also comprise a storage device 13 configured to store the events which are generated by the sensor 17 of the event camera 8.

Advantageously, the system 1 further comprises at least one target 10 intended to be fastened to the object 2 which is liable to move.

According to a first variant, the one or more targets 10 comprise a specific pattern which exhibits a non-zero luminance contrast between at least two areas of the specific pattern. This is because, for an event camera 8, it is the pixels of the sensor 17 capturing the one or more boundaries between two contrasting areas which contribute information on movement. This makes it possible to improve the information obtained and to limit the number of events which are generated by the sensor 17 of the event camera 8. The larger the luminance contrast between two areas, the better the sensor 17 is able to capture the variations in luminosity.

Figure 2:
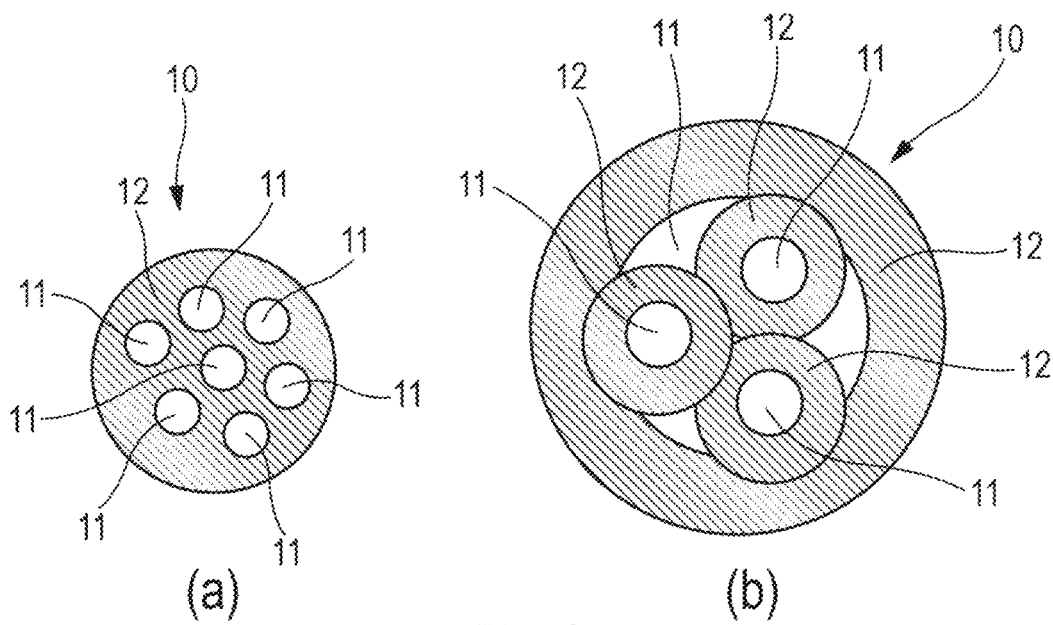
FIG. 2 depicts a first example (a) of a target and a second example (b) of a target.

For example, the specific pattern comprises a plurality of juxtaposed white dots 11 on a black background 12. FIG. 2 depicts two examples (a) and (b) of specific patterns. The specific pattern of example (a) comprises a plurality of white dots 11 on a black background 12. The specific pattern of example (b) comprises a white dot 11 surrounded by a black background 12 on which three white dots 11 surrounded by a black background 12 are arranged. In FIG. 2, the hatched areas correspond to black areas.

According to a second variant, the one or more targets 10 comprise retro-reflecting areas. In this variant, it may be important to ensure that the reflection of the one or more targets 10 is confocal with the sensor 17 of the event camera 8. Using retro-reflecting targets causes a strong contrast and therefore precise timestamping of the events when the object 2 moves in the scene S.

Figure 5:
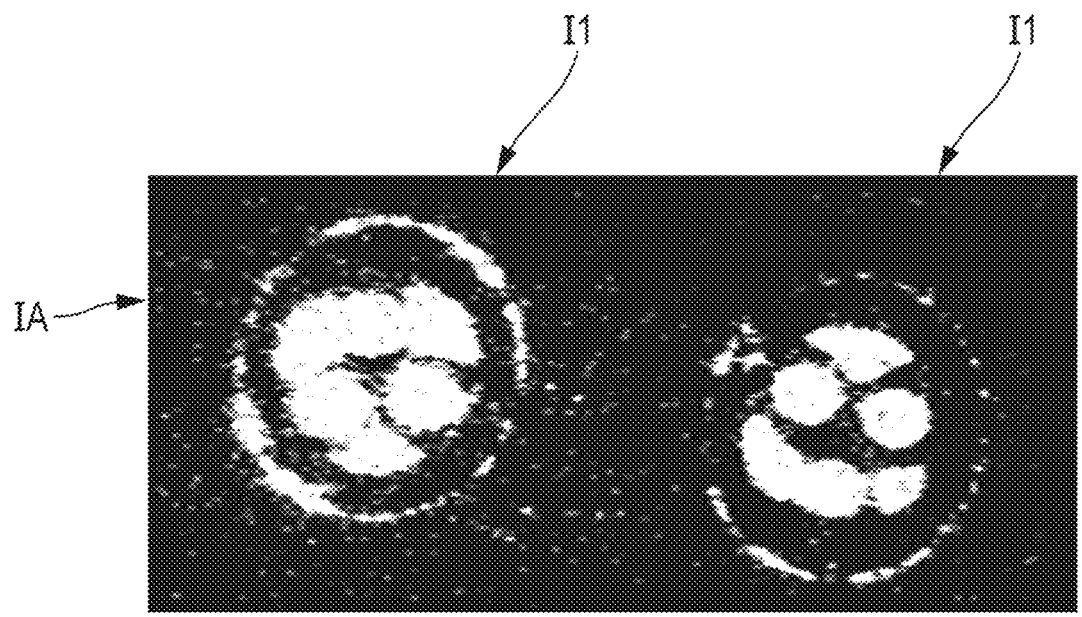
FIG. 5 depicts an example of an image of a target fastened to the object captured by the event camera when it is not dazzled by the reflected first light radiation.
Figure 6:
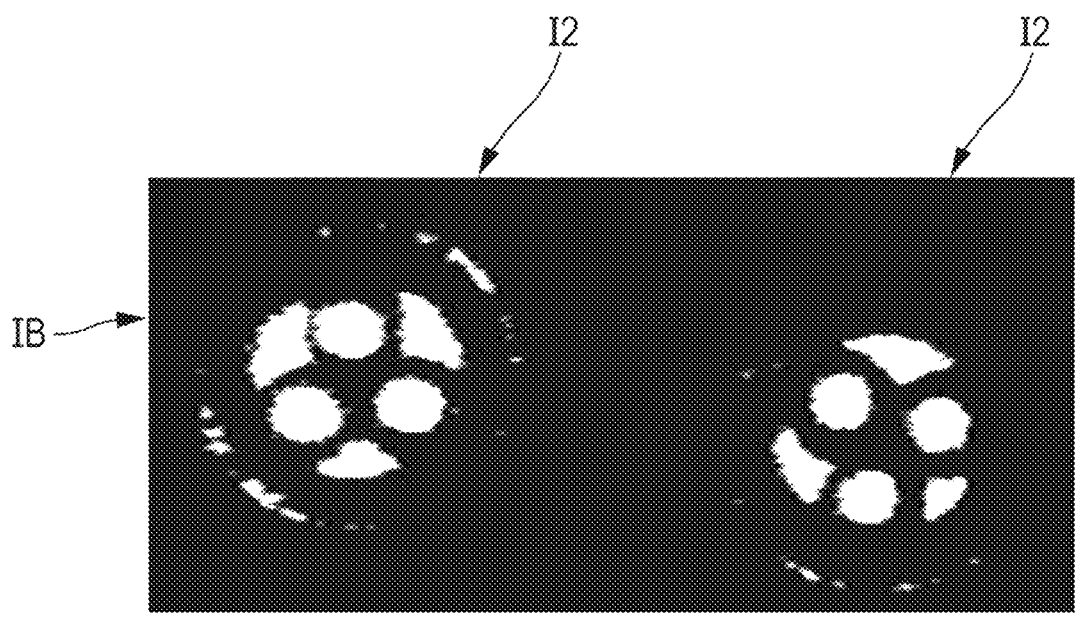
FIG. 6 depicts an example of an image of a target fastened to the object captured by the event camera when it is dazzled by the reflected first illumination.

FIG. 5 and FIG. 6 each depict an image IA and IB, respectively, captured by the sensor 17 of the event camera 8. The image IA of FIG. 5 corresponds to an image captured when the sensor 17 of the event camera 8 is not "dazzled" by the reflected first illumination 51. The areas 11 correspond to images of targets 10 (which are identical to those of FIG. 2(*b*)) fastened to the object 2. The image IB of FIG. 6 corresponds to an image captured when the sensor 17 of the event camera 8 is "dazzled" by the reflected first illumination 51. The areas 12 correspond to images of targets 10 (which are identical to those of FIG. 2(*b*)) fastened to the object 2. The advantage of dazzling the sensor 17 of the event camera 8 with the reflected first illumination 51 is clearly apparent. The images IB exhibit less noise than the images IA, which makes it possible to obtain a smaller number of events. This is because the sensor 17 of the event camera 8 will be less exposed to the variations in luminosity which are due to noise.

Moreover, the system 1 may comprise a detection device 14 configured to detect at least one movement in the scene S. The detection device 14 is able to transmit, to a control unit 18 of the event camera 8, a wake-up signal SR which is liable to switch on the event camera 8 when the detection device 14 detects at least one movement of the object 2, in order for the sensor 17 of the event camera 8 to capture the variations in luminosity. The control unit 18 is contained by the event camera 8.

By way of example, the detection device 14 corresponds to an accelerometer. In FIG. 1, the detection device 14 is separate from the object 2, for example in order to detect an aircraft being set in motion; however, it may be fastened to the object 2 in order to detect at least one movement of the object 2.

The system 1 may also comprise a processing device 15 configured to determine, as a function of time, the position of the object 2 and/or the speed at which the object 2 moves in two dimensions on the basis of the events which are generated by the event camera 8. In the case where the object 2 is non-deformable, a single system 1 may be sufficient in order to determine the position of the object 2 and/or the speed at which it moves. In the case where the object 2 is deformable, two systems 1 may be required in order to determine the position of the object 2 and/or the speed at which it moves. The position of the object 2 and/or the speed at which the object 2 moves which are determined may be transmitted to a user device 19.

Figure 3:
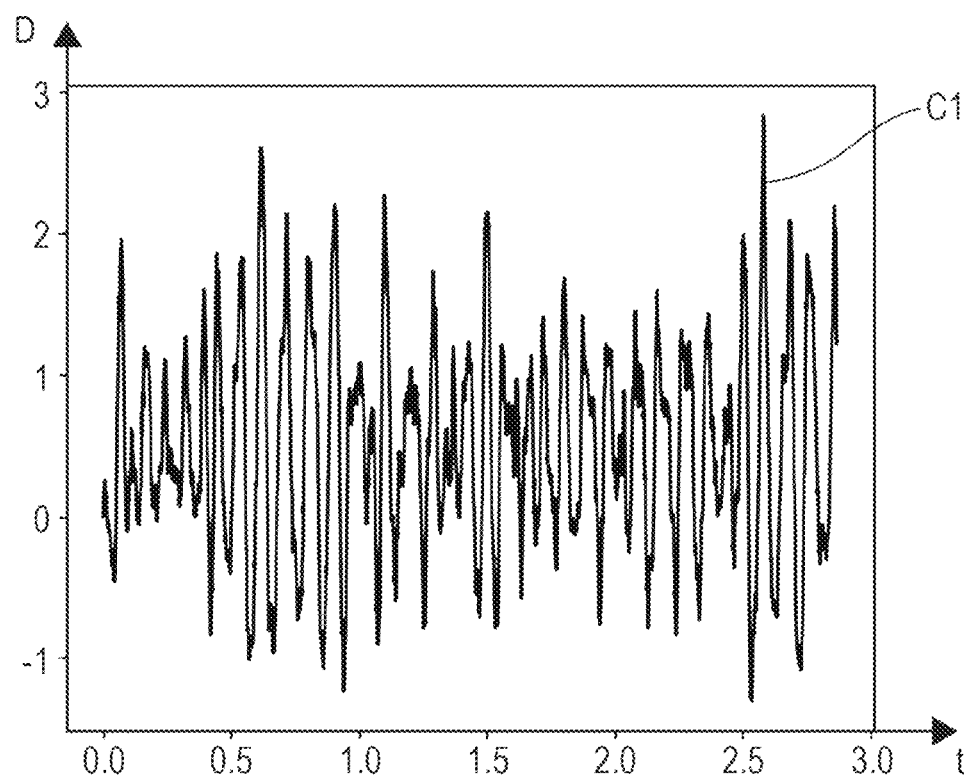
FIG. 3 depicts a curve of the change in the vertical position of the object as a function of time.

A position of the object 2 (with respect to a reference corresponding to the place where the object 2 is immobile) and/or a movement speed may be determined on the basis of at least two events which are generated by the sensor 17 of the event camera 8 as a function of time. Processing these events makes it possible to obtain these positions of the object 2 and these speeds at which it moves. FIG. 3 depicts an example of a curve C1 determined by the processing device 15. The curve C1 corresponds to a change in the vertical position D of the object 2 as a function of time t.

Figure 4:
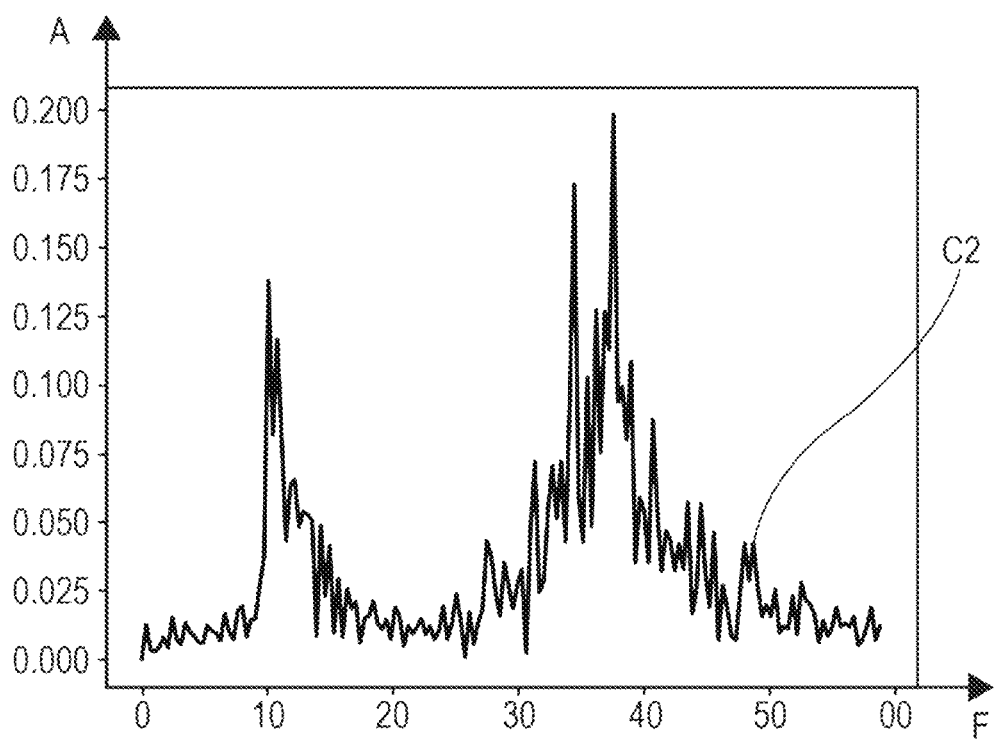
FIG. 4 depicts a curve corresponding to a fast Fourier transform frequency decomposition of a curve which is similar to that of FIG. 3.

The processing device 15 may also be configured to determine one or more movement vibration frequencies on the basis of the positions of the object 2. FIG. 4 depicts an example of a curve C2 determined by the processing device 15. The curve C2 corresponds to a change in movement amplitudes A as a function of the movement vibration frequency F of the object 2. This curve C2 may be obtained by a Fourier transform of the position of the object 2 and/or of the speed at which the object 2 moves as a function of time (curve C1).

While at least one example embodiment of the invention (s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for monitoring movements of an object, the system comprising:
    a plane semi-reflecting mirror;
    a first light source configured to emit a continuous first illumination;
    an event camera and a sensor to capture variations in luminosity in a scene in which the object is liable to move, the sensor being configured to generate at least one event when the sensor captures at least one variation in luminosity caused by at least one movement of the object;
    the plane semi-reflecting mirror being arranged so that the plane semi-reflecting mirror reflects, at least in part, the first illumination as a first illumination reflected toward the sensor of the event camera.

2. The system of claim 1, comprising a second light source configured to emit a second illumination, the second light source being placed in an image of a focus of the event camera symmetrically with respect to the plane semi-reflecting mirror, the semi-reflecting mirror being arranged so that the semi-reflecting mirror reflects, at least in part, the second illumination toward the scene in which the object is liable to move.

3. The system of claim 2, wherein the second illumination emitted by the second light source corresponds to a continuous illumination.

4. The system of claim 2, wherein the second illumination emitted by the second light source corresponds to an illumination exhibiting an intensity which varies sinusoidally as a function of time.

5. The system of claim 2, wherein the second illumination emitted by the second light source corresponds to an illumination exhibiting an intensity which varies intermittently as a function of time.

6. The system of claim 1, wherein the first light source is configured to illuminate the sensor of the event camera uniformly.

7. The system of claim 1, wherein the first light source is configured to illuminate the sensor of the event camera non-uniformly, the first light source being configured to emit a first illumination and a reflected first illumination exhibiting a light pattern having a constant luminosity except in regions of interest in which the luminosity is lower than the constant luminosity.

8. The system of claim 1, comprising at least one or more target to be fastened to the object which is liable to move, the one or more target exhibiting a specific pattern which exhibits a non-zero luminance contrast between at least two areas of the specific pattern.

9. The system of claim 8, wherein the one or more targets comprise retro-reflecting areas.

10. The system of claim 1, comprising a storage device configured to store events which are generated by the sensor of the event camera.

11. The system of claim 1, comprising a detection device configured to detect at least one movement in the scene, the detection device being able to transmit, to a control unit of the event camera, a wake-up signal which is liable to switch on the event camera when the detection device detects at least one movement in the scene.

12. The system of claim 1, comprising a processing device configured to determine, as a function of time, a position of the object and/or a speed at which the object moves on a basis of events which are generated by the sensor of the event camera.

13. The system of claim 12, wherein the processing device is configured to determine one or more movement vibration frequencies on a basis of positions of the object.

* * * * *